United States Patent [19]

Denoor et al.

[11] 3,911,963

[45] Oct. 14, 1975

[54] METHOD OF MANUFACTURE OF AN ELONGATED ENCLOSURE OF REVOLUTION

[75] Inventors: Gaston Denoor, Grenoble, France; Geoffrey David Ransford, Toronto, Canada

[73] Assignees: B.V.S., Grenoble, France; Foundation of Canada Engineering Corporation Ltd., Toronto, Canada

[22] Filed: Nov. 16, 1973

[21] Appl. No.: 416,449

[30] Foreign Application Priority Data

Nov. 20, 1972 France .............................. 72.41108

[52] U.S. Cl. ................. 138/140; 29/405; 29/157 R; 138/148; 138/153; 138/DIG. 5
[51] Int. Cl.² ..................... F16L 9/14; B23Q 17/00
[58] Field of Search ................. 29/404, 405, 157 R; 138/140, 153, DIG. 5, 177, 148

[56] References Cited
UNITED STATES PATENTS

| | | | |
|---|---|---|---|
| 2,063,325 | 12/1936 | McLeod............................ | 138/140 |
| 2,386,747 | 10/1945 | Ris................................. | 138/140 X |
| 3,257,718 | 6/1966 | Krenzke............................ | 29/404 |
| 3,443,600 | 5/1969 | Sherwood......................... | 138/153 |
| 3,720,235 | 3/1973 | Schrock.......................... | 138/177 X |
| 3,813,098 | 5/1974 | Fischer et al. ................ | 138/DIG. 5 |
| R24,366 | 5/1956 | Comstock.......................... | 138/140 |

FOREIGN PATENTS OR APPLICATIONS 916,075   12/1972   Canada........................... 138/DIG. 5

OTHER PUBLICATIONS

"Cylindrical Metal Pressure Bodies Made by Limited Expansion of their Walls With or Without Prestress," Proceeding of First International Conference on Pressure Vessel Technology, The American Society of Mechanical Engineers, pp. 877–893, Paper No. 8, Nov. 1970.
G. Dendor, "Evolution of the Technique for Construction of Pressurized Pipelines," The Pipeline Engineering Convention 1970, Brintex Exhibitions Ltd., Paper No. 8, Apr. 1970, pp. 1–12.

*Primary Examiner*—Lowell A. Larson
*Assistant Examiner*—D. C. Reiley, III
*Attorney, Agent, or Firm*—Cameron, Kerkam, Sutton, Stowell & Stowell

[57] ABSTRACT

A method of making a pipe having an outer reinforcing envelope, intended for internal pressure and low temperature usage. The method includes calculating the clearance between the pipe and the envelope when unpressurized and at ambient temperature which would result in the working stresses due to internal pressure and reduced temperature off-setting each other, having regard to the materials and the predetermined dimensions of the tube and envelope.

9 Claims, 4 Drawing Figures

FIG:1
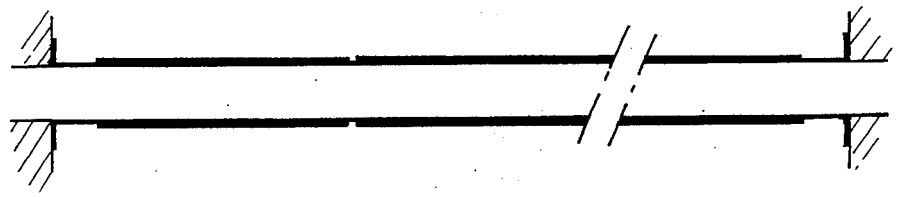
FIG:2
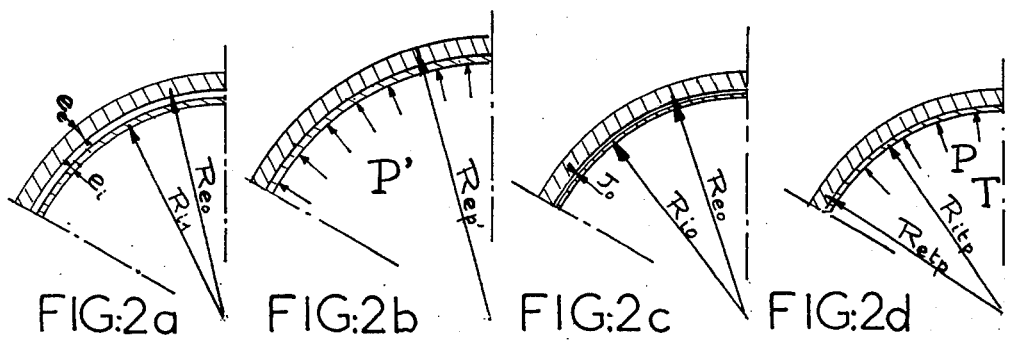
FIG:2a  FIG:2b  FIG:2c  FIG:2d
FIG:3
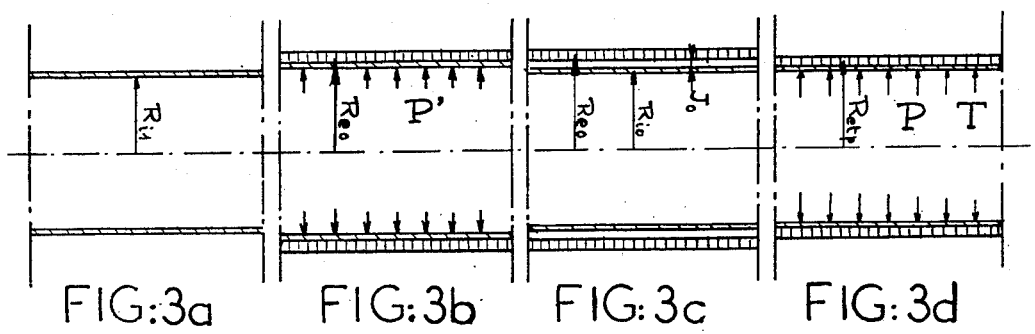
FIG:3a  FIG:3b  FIG:3c  FIG:3d
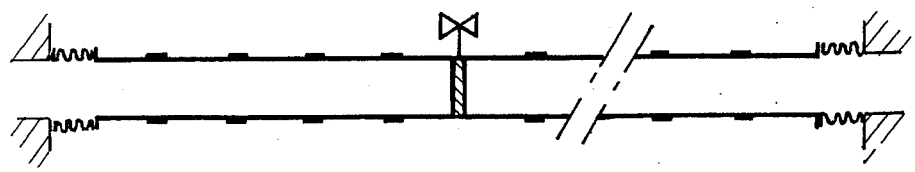
FIG:4

METHOD OF MANUFACTURE OF AN ELONGATED ENCLOSURE OF REVOLUTION

BACKGROUND OF THE INVENTION

The present invention concerns a method of manufacture of an elongated enclosure of revolution intended to withstand internal pressure at low temperatures.

For the conveyance of fluids at low temperature in the cryogenic industry, tubes consisting of a relatively thick single wall are widely used. When such single-wall tubes are anchored at their ends they can only withstand fairly limited lowering of temperature. It can be shown that a steel tube cannot withstand a lowering of temperature greater than about 100°. Under these conditions members such as lyres, bellows, sliding joints, etc. have to be provided to allow contraction of the tubes, in addition such single-wall tubes cannot be produced from ordinary steel and are very heavy. For a long time means have been known of producing externally reinforced tubes for resisting an internal pressure. The reinforcement is obtained by arranging around the tube an outer envelope which may be a collar, a certain number of spaced hoops or a winding of wire or cable. In order to fit the outer envelope onto the tube various methods are known including winding the wires or cables under tension around the tube or expanding the wall of the tube outwardly against the wire or hoops.

SUMMARY OF THE INVENTION

The present invention provides a method of manufacture of an elongated enclosure of revolution intended to withstand internal pressure at low temperatures and consisting of an inner tube surrounded by an outer envelope, wherein before being subjected to internal pressure at low temperatures the tube and the envelope are placed in an initial state at ambient temperature and without internal pressure, such that under working temperatures and pressures the stresses due to the internal pressure offset the stresses due to the relative contraction of the tube and the envelope.

Preferably the radius of the tube, the materials and the thicknesses of the tube and the envelope are first selected according to working requirements, an initial difference in radius required between the envelope and the tube so that the working stresses remain within permissible limits is determined by calculation and the envelope and the tube are then placed in the said initial state.

BRIEF DESCRIPTION OF THE DRAWINGS

In order that the invention may be fully understood an embodiment thereof will now be described by way of example with reference to the accompanying drawings in which:

FIG. 1 is a diagrammatic longitudinal section of a tube anchored at its ends.

FIG. 2 displays in partial transverse section various phases of production of a tube in accordance with the invention.

FIG. 3 displays in longitudinal section various phases of production of a tube in accordance with a further embodiment of the invention.

FIG. 4 is a diagrammatic view of a tube installed with members allowing its contraction.

DETAILED DESCRIPTION

The first stage of the method consists in selecting the radius to be given to the inner tube, the materials to be used to constitute the tube and its envelope and the thicknesses of the walls. This selection will be made taking into account the conditions of service, the nature and flow of the fluid in the tube, and in particular the length of the tube.

Two cases will be discussed according to whether the tube is or is not subjected to an end force.

Further, throughout the description the following general expressions will be employed:

P = the effective pressure exerted on the wall
R = the inside radius of the wall
e = the thickness of the wall
$\Delta R/R$ = relative variation in the radius
$\Delta L/L$ = relative variation in the length
E = Young's Modulus
$\sigma L$ = longitudinal stress
$\sigma C$ = circumferential stress
$\alpha$ = mean coefficient of expansion between the ambient temperature and the temperature in service.
$\nu$ = Poisson's Ratio
T = variation in temperature Depending upon the walls and the circumstances to which they are applied, the following indices will be used with the above expressions:

i = for the inner wall
e = for the outer wall
o = ambient temperature (20°, for example)
t = at the working temperature (for example, 160° below 0°C)
p = under working pressure The first case concerns a straight tube anchored at its ends and not subjected to any end force, as indicated in FIG. 1.

If consideration is given only to the cooling and of the tension due to the tendency of the tube to contract, the radii of the wall of the tube and of the envelope become respectively:

$$R_{it} = R_{io} ( 1 - \alpha \Delta t ( 1 + \nu_i ) ) \quad (1)$$
$$R_{et} = R_{eo} ( 1 - \alpha \Delta t ) \quad (2)$$

However, the cooling is normally connected with an increase in the internal pressure which subjects the walls to circular stresses:

$$\sigma\, Cipt = \frac{P_i - P_e}{e_i} R_{it} \quad (3)$$

$$\sigma\, Cept = \frac{P_e}{e_e} R_{et} \quad (4)$$

$P_i$ and $P_e$ being, as has been seen, the pressures being exerted respectively on the wall of the tube and on that of the envelope.

Under the action of the pressure the radius of the envelope increases and becomes:

$$R_{ep} = R_{eo} (1 - \alpha_e \Delta_t) \left(1 + \frac{1}{E_e} \sigma\, Cetp\right) \quad (5)$$

The inner wall anchored at its ends undergoes on this account a longitudinal stress due to the pressure $\sigma l = \nu i\, \sigma c$ and the radius of the tube thus becomes:

$$R_{itp} = R_{io}(1 - \alpha_i \Delta_t)\left(1 + \sigma Ci \frac{1 - \nu i}{E_i}\right) \quad (6)$$

The envelope and particularly the inner tube being thin with respect to their radii, the radii of the walls in service being equal, the tube is expanded into contact with the envelope. Therefore:

$$R_{itp} = R_{etp}$$

The initial difference in radius between the tube and the envelope is: $J_o = R_{eo} - R_{io}$; then referring to the mean radius R and neglecting terms of the second order:

$$J_o \cong R \left( (\alpha_e - \alpha_i) \Delta t + \frac{\sigma ci}{E_i}(1 - \gamma(1 - \alpha_i \Delta t)) - \frac{\sigma ce}{e_e}(1 - \alpha_e \Delta t) \right) \quad (7)$$

This expression can be simplified and written:

$$J_o \cong R \left\{ (\alpha_e - \alpha_i) \Delta t - \frac{\sigma e}{E_e} + \frac{\sigma i}{E_i} \right\} \quad (8)$$

In the case of an inner tube anchored at its ends, the pipe will therefore be produced in the following manner:

Taking into consideration the working conditions, the mean radius R of the tube and the working pressure P will be chosen in view of the materials composing the tube and its envelope and in particular their mechanical characteristics. Applying the safety factors required the permissible strains $\sigma cet$ and $\sigma cit$ will be fixed. From (3) and (6) can then be deduced the pressure $P_e$ being exerted in service on the wall of the envelope, and from (4) and (5) can be calculated the thickness $e_e$ to be given to the envelope.

It is advisable to ascertain that the longitudinal strain $\sigma lit = E_i \alpha_i \Delta t + vi \sigma cit$ will be less than the maximum permissible strain $\sigma cit$.

Finally (8) gives the initial clearance $J_o = R_{eo} - R_{io}$ to be provided.

If the difference in radius $J_o$ thus calculated is positive and sufficient to allow slipping of the envelope onto the tube it will be sufficient to produce and gauge the tube and the envelope separately and then move the envelope onto the tube. The tube can then be anchored at its ends and when the assembled pipe is put into service the wall of the tube will fit itself against the wall of the envelope and, given the calculated initial clearance, the stresses in the tube and the envelope due to the cooling and internal pressure will remain within permissible limits.

This method of pipe production in accordance with the present invention can, however, only be employed if the envelope is composed of a plurality of collars mounted on the tube and if the clearance given by calculation is sufficient.

In the second case, where the envelope is produced, for example, by a winding of wire, or if the clearance given by calculation is insufficient to enable the collars to be slipped onto the tube, it is necessary to produce an envelope and a tube of original dimensions different from the calculated dimensions and to subject the assembly to a treatment enabling the clearance given by calculation to be obtained after return to rest. This treatment can be a hydraulic or thermal expansion. Thus in the case in which the envelope is composed of collars, the procedure is as shown in FIG. 2: the tube is produced of a smaller diameter to enable the tube to be slipped into the collars (FIG. 2a). Then, by application of internal pressure, the inner tube is expanded inside the envelope so that, taking into account the elastic limits of the materials, the envelope remains in the elastic domain while the tube takes a permanent deformation (FIG. 2b). The pressure can be adjusted so that the elastic recovery of the walls as a whole gives the clearance calculated beforehand (FIG. 2c). Obtaining the clearance at ambient temperature for collared members can be achieved in the following fashion:

Production of the inner wall with a diameter 2 $R_{i1}$ substantially smaller than its definitive diameter (for example, smaller by 0.5 to 2% than the final diameter).

Production of the outer wall at its final diameter 2 $R_{eo}$ (except for the tolerances).

Placing the inner wall in the outer wall; this placement being facilitated by the relatively large clearance (FIG. 2a).

Mounting the assembly between two pressure — plates furnished with the necessary seals so that the inner wall may be placed under pressure.

Placing the inner wall under progressive pressure (FIG. 2b) until the elastic limit of the inner wall is exceeded and the outer wall is deformed elastically in order to obtain the necessary clearance in accordance with the calculation below:

Let:
$r_i$ be the elastic limit of the inner wall
$E_e$ be Young's Modulus for the outer wall
$E_i$ be Young's Modulus for the inner wall During the plastic deformation of the inner wall the circular stress in the inner wall has the value $r_i$ $$\sigma ci = r_i$$

When the inner wall is forced by the pressure into contact with and against the outer wall the pressure, having been substantially constant during the plastic deformation of the inner wall alone, increases in proportion to the elastic deformation of the outer wall up to a value P' called the gauging pressure.

The relative increase in diameter of the outer wall has the value $$\frac{\Delta R_e}{R_e} = \frac{1}{E_e} \sigma ep'$$

and the radius of the outer wall becomes:

$$R_{ep}' = R_{eo} \left( 1 + \frac{\sigma ep'}{E_e} \right)$$

If the pressure is brought back to 0, the relative variation in the radius of the inner wall has the value:

$$\frac{\Delta R_i}{R_i} = \frac{r_i}{E_i}$$

Now, it is accepted that $R_{i_p} = R_{e_p}$, the walls being thin with respect to their diameter. The clearance $J_o$ existing between the walls after recovery without pressure (FIG. 2c) is easily deduced from it:

$$J_o = R_{eo} - R_{io} = - R_{eo} \frac{\sigma ep}{E} + \frac{R_{eo} \, r_i}{E_i} \left(1 + \frac{\sigma ep}{E_e}\right)$$

The clearance $J_o$ having been calculated beforehand, the stress to which the outer wall must be subjected is deduced from it:

$$\sigma eo = \frac{J_o E_i - R_{eo} \, r_i}{- R_{eo} E_i + R_{eo} \, r_i} E_e \quad (9)$$

and consequently the gauging pressure $P'$ necessary for obtaining this stress will be:

$$P' = \frac{e_e \, \sigma ep}{R} + \frac{e_i \, r_i}{R} \quad (10)$$

The pipe thus treated can then be put under working conditions (FIG. 2d), with certainty that the strains due to cooling and pressure will remain within the indicated limits.

Of course other methods of production can be employed. Thus the inner tube and the envelope can be gauged separately, the envelope being expanded by raising its temperature and slipped onto the inner tube so that at rest the calculated clearance is obtained.

In the case in which the envelope is a wire, ribbon or cable winding on the inner tube the necessary clearance cannot be given directly. That is why, having gauged the inner tube to the required radius (FIG. 3a) it is put under pressure so that its radius increases by the calculated difference (FIG. 3b), the wire can then be wound on the tube, the pressure relieved (FIG. 3c) and the whole put into service (FIG. 3d).

The various embodiments which have been described are equally feasible if the clearance calculated in accordance with expression (8) is negative. This case corresponds in fact with a preliminary clamping of the envelope onto the tube. The methods of hydraulic or thermal expansion previously referred to can be used to accomplish this clamping. In the case of a wire winding, the wire can be wound under tension onto a tube under no pressure, gauged to the required dimension.

By way of example, the production is considered a pipe of inner diameter 400 mm for service at a pressure $P = 30$ kg/cm² and a temperature of $-160°$. The ambient temperature is assumed to be 10°C. It has been decided to produce a pipe consisting of an inner tube of metal of "Invar" type surrounded by an envelope of 9% nickel-steel. The mechanical characteristics are therefore:

$\alpha i = 1.5 \times 10^{-6}$
$\alpha e = 9 \times 10^{-6}$
$E_e = 20,000$ Kg/mm²
$E_i = 14,500$ Kg/mm²
and the permissible stresses:
$\sigma itp = 20$ Kg/mm²
$\sigma etp = 40$ Kg/mm²

A thickness $ei = 1$mm is fixed for the inner tube. Calculation gives the pressure P being exerted on the envelope: $P_e = 20$ Kg/cm² and from it is derived the thickness of the envelope $e_e = 1$ mm.

It is verified that under these conditions the longitudinal stress $\sigma Li$ being exerted on the tube will not exceed 5 Kg/mm² which is perfectly permissible.

Finally the initial clearance to be established between the walls is calculated, formula (8) giving a clearance $J_o = 0.1316$ mm.

This clearance is insufficient to enable slipping of the collars onto the tube.

Collars therefore have to have different diameters with a clearance enabling mounting without difficulty, say, 1% of the diameter, for example.

For a mean radius $R = 200$ there will be the following dimensions:

| Inner collar : | inner diameter 396 |
| | outer diameter 398 |
| Outer collar : | inner diameter 402 |
| | outer diameter 404 |
| | $ri = 40$ Kg/mm² |

From equations (9) and (10) is derived the gauging pressure $P' = 41$ Kg/mm² to which the tube must be subjected in order to obtain upon returning to zero pressure the initially calculated clearance $J_o = 0.1316$ mm.

Having obtained this clearance it is certain that under working conditions the stresses exerted on the walls will remain within permissible ranges.

The case of a pipe anchored at its ends, which has just been described, is the most important since it enables members allowing contraction of the tube such as bellows, joints, lyres, etc. to be dispensed with. These members are obligatory when single-walled pipes are employed. It can in fact be shown that the temperature drop which a single-walled pipe can withstand is very much limited by the mechanical characteristics of the pipe; thus a single-walled pipe of steel with a modulus of elasticity of 20,000 Kg/mm² cannot withstand a lowering of temperature greater than 105°. Thanks to the present method of construction of double walled pipes, a pipe can be provided to withstand much greater drops in temperature even though anchored at its ends.

However, the teachings of the present invention are obviously also applicable in the second case, where the pipe is installed with a bellows or sliding joint. In this case, however, end effects must be considered, as when there is a variation in the diameter of the pipe, of an elbow or of a closed valve.

It is known that in this case there exists a force of tension or compression on the pipe which creates a longitudinal stress equal to a fraction K of the longitudinal stress given by an end of diameter equal to that of the pipe.

The coefficient K is negative if an expansion is present, the pipe being in that case compressed.

K lies between 0 and 1 if there is a necking in of the pipe.

K is equal to 1 if an end is present, which is the case of a closed valve.

The formulae previously indicated are obviously affected by this end effect which in particular causes a longitudinal stress to appear:

$$\sigma litp = K \frac{P_i}{2_{e_i}} \quad (11)$$

As the tube is not anchored there is no other longitudinal stress. In order to reduce the weight of the wall of the inner tube the thickness of this wall will be chosen so that this longitudinal stress is equal to the permissible stress. Therefore:

$$\sigma litp = \sigma citp$$

On this account under the working pressure and temperature coditions:

$$R_{etp} = R_{eo}(1 - \alpha_e \Delta t)\left(1 + \frac{\sigma cetp}{E_e}\right)$$

$$R_{itp} = R_{io}(1 - \alpha_i \Delta t)\left(1 + \frac{\sigma citp}{E_i}\right)(1-\nu i)$$

Of course, the tube being thin with respect to its diameter, in service after expansion of the tube against the envelope:

$$R_{itp} = R_{etp}$$

From this is deduced the initial difference in radii to be established between the tube and its envelope at rest: $J_o = R_{eo} - R_{io}$, which is written by referring to the mean radius R:

$$J_o \cong R\left((\alpha_e - \alpha i)\Delta t - \frac{\alpha e}{E_e} + \frac{\alpha i}{E_i}(1-\nu i) - \alpha_i\Delta t \frac{\sigma i}{E_i}(1-\nu i)\right)$$

(12)

Which can be written after simplifying:

$$J_o \cong R\left((\alpha e - \alpha i)\Delta t - \frac{\sigma e}{E_e} + \frac{\sigma i}{E_i}(1 - \alpha i \Delta t)\right) \quad (13)$$

In practice, having determined as a function of the working conditions the working pressure $P_i$, the mean radius R and the permissible stresses $\sigma citp$, $\sigma cetp$ taking into account the selection of the materials of the tube and its envelope, from (9) will be found the thickness $e_i$ to be given to the tube as a function of the expected end effect, and one will deduce from (3) and (4) the pressure $P_e$ will be determined exerted on the envelope and its thickness $e_e$.

The expression (13) will give the initial difference in radius to be provided between the tube and the envelope at rest.

In order to obtain this calculated clearance, for example, one of the methods indicated previously in the case of the pipe anchored at its ends can be used.

Thus, as in the preceding example of the 400 mm tube of "Invar" surrounded by an envelope of 9% nickel-steel, but (FIG. 4) in the case of a pipe not anchored at its ends and with a closed valve (K=1), the drop of temperature being still 170°C and the working pressure 30 Kg/mm².

It follows:
$E_i = 14,500$
$E_e = 20,000$
$\sigma_i = 20 Kg/mm^2$  $\sigma e = 40 Kg/mm^2$ $\alpha i = 1.5 \times 10^{-6}$  $\alpha_e = 9 \times 10^{-6}$ If a longitudinal stress of 20Kg/mm² is accepted the tube will be given a thickness $e_i = 1.5$ mm.

The pressure exerted on the envelope will be $P_e = 15$ Kg/cm² and the envelope will have a thickness $e_e = 1.5$ mm.

The tube and the envelope will be slipped into one another so that at ambient temperature and without any internal pressure there is a clearance:

$$J_o = 0.0448 mm$$

This clearance being insufficient to enable slipping on of the collars, collars of 2 mm thickness and of inner diameters respectively 396 mm for the inner collar and 402 mm for the outer collar will be used as described above.

The equations (9) and (10) enable the calculation of the stress $\sigma ep' = 50.7$ Kg/mm² to which the outer wall will have to be subjected and the necessary gauging pressure $P' = 45.4$ Kg/mm² in order to obtain upon recovery to zero pressure the clearance calculated beforehand: $J_o = 0.0448$ mm.

It can be seen that, in the case in which it is preferred not to anchor the pipe at its ends, the method in accordance with the invention nevertheless enables double-walled tubes to be produced with a perfect control of the stresses exerted on the walls.

The described method may be varied within the scope of the succeeding claims. For example where the outer envelope is a wire or ribbon winding, this winding could be carried out on a sleeve open longitudinally and held at the required dimension $R_{eo}$. The tube would then be introduced into the sleeve and the combination subjected to working conditions, the sleeve offering no resistance to the contraction and therefore not being involved in the calculation of the stresses.

What we claim is:

1. A method of manufacture of an elongated enclosure of revolution to withstand an internal pressure at low temperatures and consisting of an inner tube surrounded by an outer envelope, the steps of placing the tube and the envelope in an initial state at ambient temperature and without internal pressure, such that under working temperatures and pressures the stresses due to the internal pressure offset the stresses due to the relative contraction of the tube and the envelope and then subjecting the enclosure to internal pressure at low temperatures, including the steps of first selecting the radius of the tube, the materials and the thicknesses of the tube and of the envelope according to working requirements, then determining an initial difference in radius between the envelope and the tube whereby the working stresses remain within permissible limits, then placing the envelope and the tube in said initial state and including the steps of gauging the envelope and the tube to the required dimensions, then mounting the tube in the envelope and the enclosure thus formed being then subjected to said working conditions.

2. A tube produced by a method according to claim 1.

3. A method according to claim 1 including the step of forming the envelope of at least one collar surrounding the tube.

4. A method according to claim 1 including the step of forming the envelope of a plurality of rings distributed along the outer wall of the tube.

5. A method according to claim 1 including the step of forming the tube with a radius smaller than the determined radius providing clearance within the gauged envelope, then expanding the tube and envelope combination under pressure whereby the envelope remains in the elastic domain and the tube is permanently deformed such that after elastic recovery of the combination the said difference in radii is obtained.

6. A method according to claim 1 including the step of preparing the envelope and the tube separately to the determined dimensions and then expanding the envelope thermally and then slipping the envelope onto the tube, the thus formed enclosure then being subjected to said working conditions.

7. A method according to claim 1 including the step of forming the envelope of a helical binding.

8. A method according to claim 7 including the steps of expanding the inner tube increasing its radius by said determined difference, then placing the helical binding on the expanded tube, then discontinuing the forced expanding of the tube and the thus formed enclosure is then subjected to said working conditions.

9. A method according to claim 7 including the step of forming the binding on a longitudinally open sleeve, then introducing the tube into the sleeve and the thus formed enclosure is then subjected to said working conditions.

* * * * *